Aug. 18, 1959    S. HOROWITZ    2,899,694
BEDPAN VEHICLE
Filed March 24, 1955    3 Sheets-Sheet 1
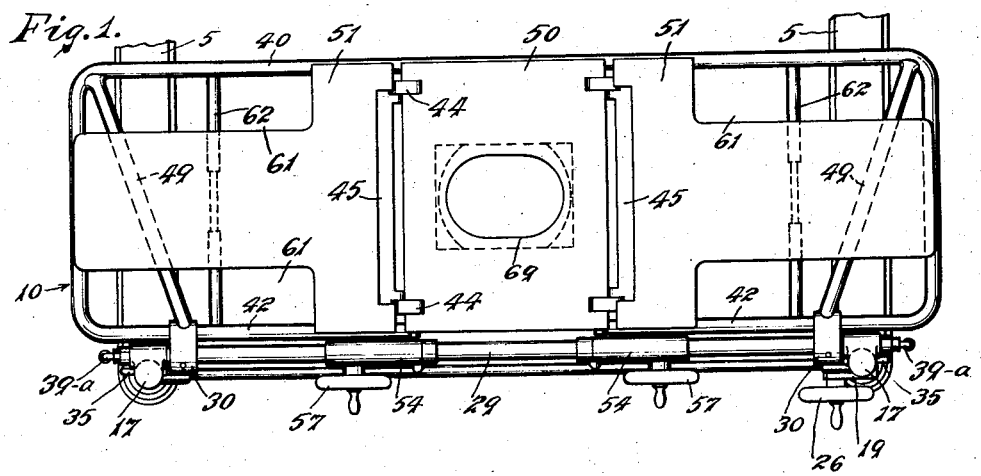
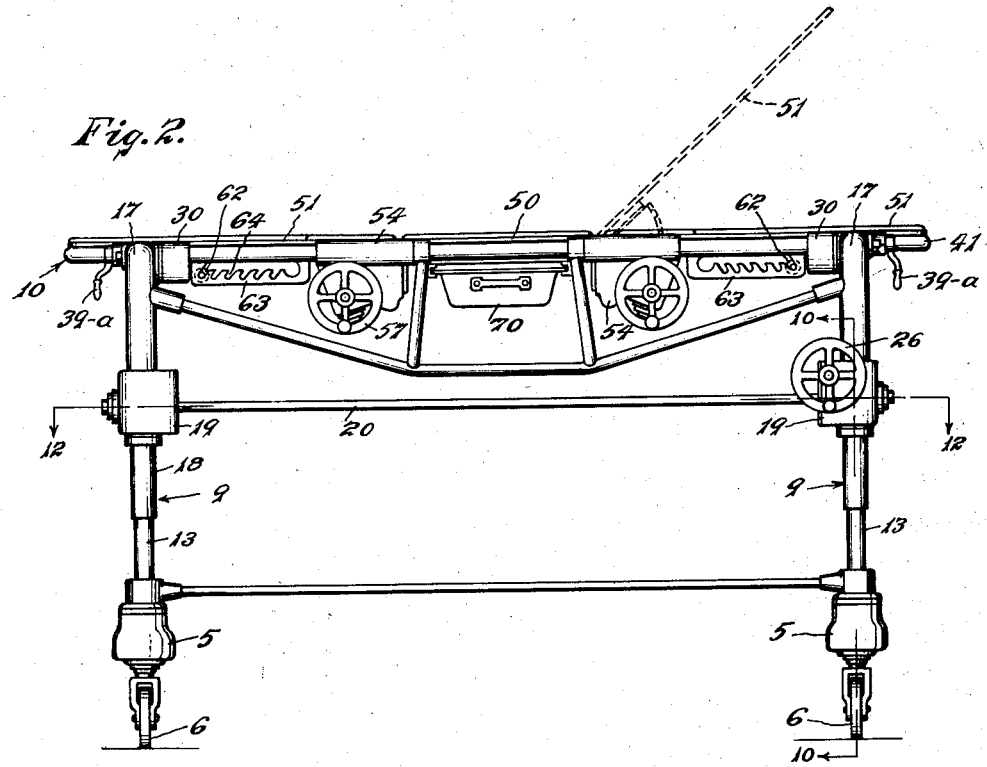
INVENTOR.
SIDNEY HOROWITZ.
BY
*Louis V. Lucia*
ATTORNEY.

Aug. 18, 1959     S. HOROWITZ     2,899,694
BEDPAN VEHICLE
Filed March 24, 1955     3 Sheets-Sheet 2
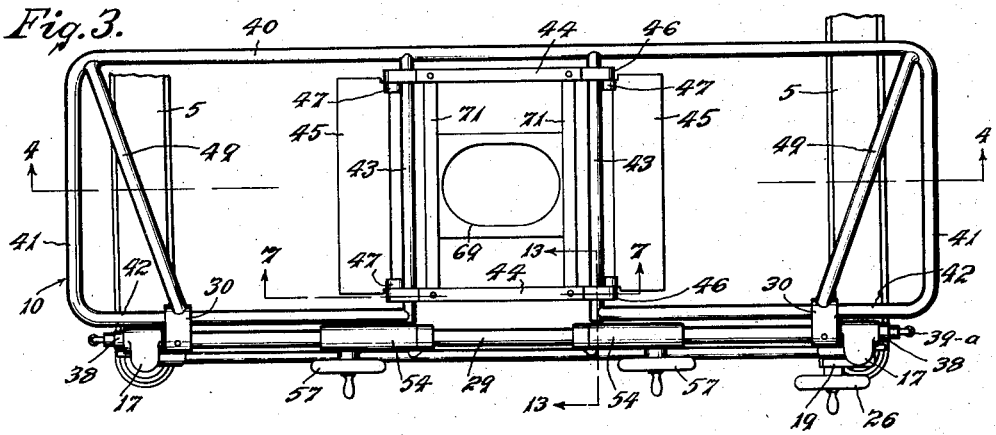
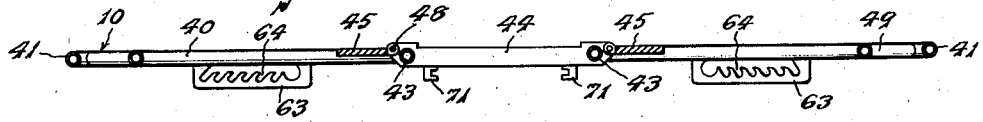
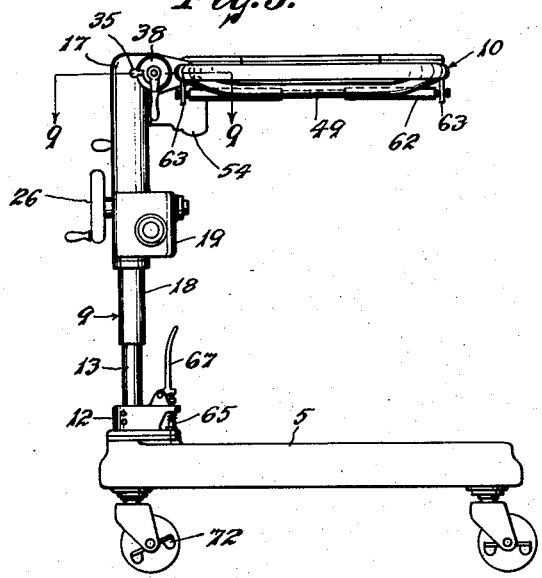
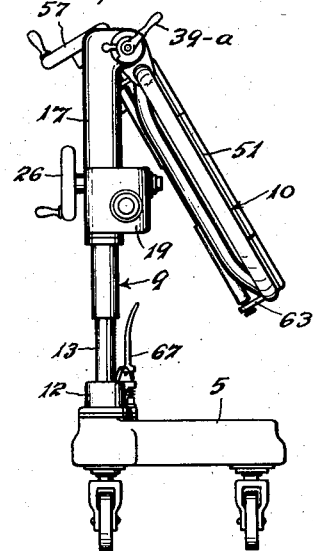
INVENTOR.
SIDNEY HOROWITZ.
BY Louis V. Lucia
ATTORNEY.

Aug. 18, 1959 — S. HOROWITZ — 2,899,694
BEDPAN VEHICLE
Filed March 24, 1955 — 3 Sheets-Sheet 3
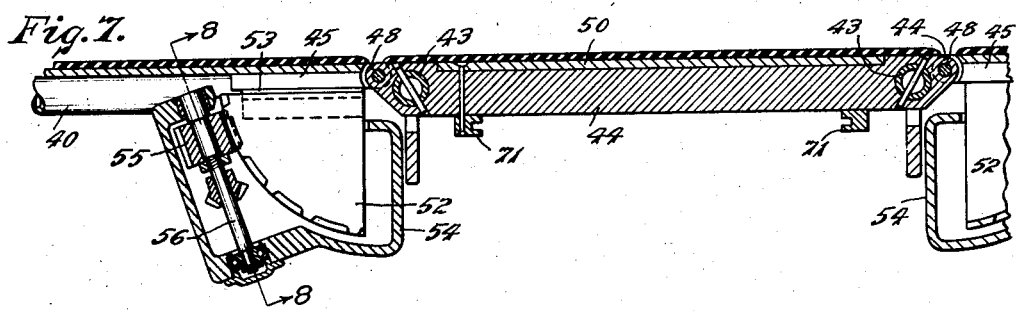
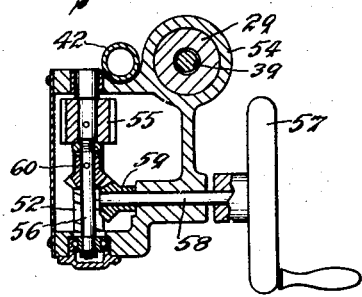
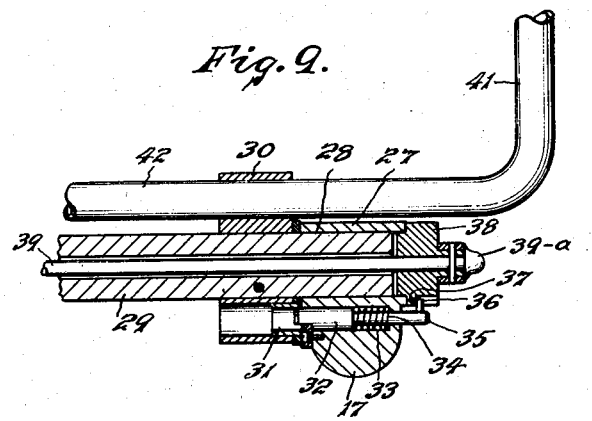
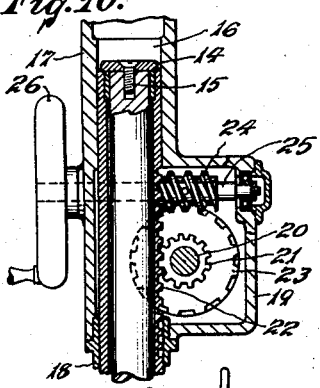
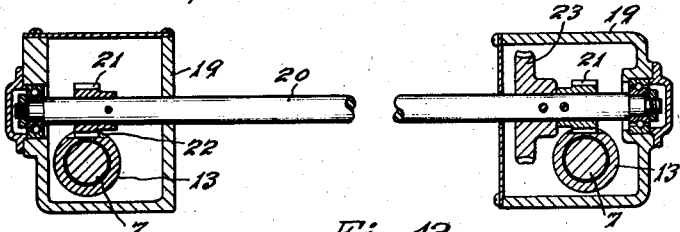
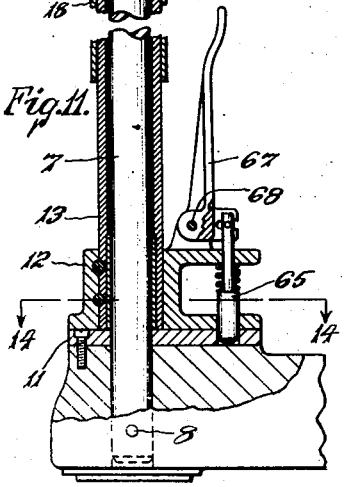
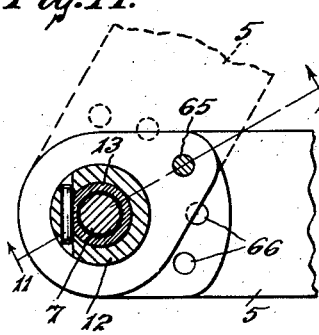
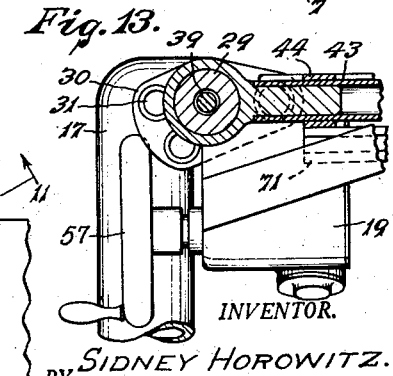
INVENTOR.
SIDNEY HOROWITZ.
BY Louis V. Lucia
ATTORNEY.

United States Patent Office 2,899,694
Patented Aug. 18, 1959

1

2,899,694

BEDPAN VEHICLE

Sidney Horowitz, New Hyde Park, N.Y., assignor to Inventions Association, Incorporated, New Hyde Park, N.Y.

Application March 24, 1955, Serial No. 496,561

6 Claims. (Cl. 5—90)

This invention relates to a bedpan vehicle and more particularly to an apparatus which is primarily intended for use by invalids in hospitals, sickrooms and the like for purposes of defecation.

The said device generally comprises a vehicle that is adapted to be moved into position over the patient's bed and lowered upon said bed so that the patient may be easily slid, or rolled, onto the device and then removed from the bed and the device adjusted to support the patient in maximum comfort.

An object of the present invention is to provide such a device which may be readily operated by a nurse, or other attendant, with a minimum of exertion and which can be used from either side of the bed with the patient's head disposed at either end of said bed.

A further object is to provide such a device having a stationary central section with an opening therein and a receptacle removably mounted thereunder, and end sections which are independently adjustable relatively to the said central section to support a patient in a comfortable sitting position thereon.

A further object is to provide such a device having the means for easily raising or lowering either end section of the device so as to comfortably support the patient in sitting position upon the central portion.

A still further object of the invention is the provision of such a device with suitable means for supporting the patient's feet and legs while in such sitting position.

A still further object is to provide such a device which may be folded so as to occupy a minimum amount of space for storage purposes.

A still further object of this invention is to provide highly efficient, durable and easily operable means for adjusting the device into different positions.

Further objects and advantages of this invention will be more clearly seen from the following description and the accompanying drawings in which:

Fig. 1 is a plan view of a bedpan vehicle embodying the present invention.

Fig. 2 is a side view thereof.

Fig. 3 is a plan view with the patient supporting end plates removed therefrom.

Fig. 4 is a sectional front view on line 4—4 of Fig. 3.

Fig. 5 is an end view showing the said device in normal position.

Fig. 6 is a similar view showing the said device in folded opsition for storage.

Fig. 7 is an enlarged sectional front view of a portion of said device on line 7—7 of Fig. 3.

Fig. 8 is a sectional end view on line 8—8 of Fig. 7.

Fig. 9 is a sectional plan view on line 9—9 of Fig. 5.

Fig. 10 is a sectional end view on line 10—10 of Fig. 2.

Fig. 11 is a sectional end view on line 11—11 of Fig. 14.

Fig. 12 is a sectional plan view on line 12—12 of Fig. 2.

2

Fig. 13 is a sectional end view on line 13—13 of Fig. 3.

Fig. 14 is a sectional plan view on line 14—14 of Fig. 11.

As shown in the drawings, my improved bedpan vehicle includes a pair of feet 5—5 which are mounted upon suitable casters 6—6 to render the vehicle easily movable upon a floor.

Each of said feet 5—5 has mounted thereon a vertical shaft 7 which is rigidly secured to its respective foot by suitable means, such as a pin 8 or the like.

The said shafts extend into a pair of leg units 9—9 which are vertically extendable to different lengths and support, at the upper ends thereof, a horizontal frame, generally indicated at 10, which is swivelly secured to said legs.

In detail, the said vehicle is constructed as follows:

Each of the legs 9—9 has a supporting plate 11 which surrounds the shaft 7 and is secured to the top of the foot 5 to prevent rotation thereof. The said plate supports a base member 12 that is rigidly secured to a vertical tube 13 through which the shaft 7 extends longitudinally; the said shaft being swivelly secured to said tube by means of a retaining washer 14 that overlaps the end of the tube and is attached to the end of the shaft by a suitable screw 15 so as to rotatably secure the shaft 7 and prevent axial movement thereof relatively to the tube. The said tube 13 is slidably contained in an axial opening 16 in an upper section 17 of the respective leg 9 and a guide sleeve 18 is provided at the lower end of said leg section to slidably guide the tube in said section.

Each upper leg portion includes a housing 19 in which there is journalled a horizontal shaft 20 that extends between said legs and has thereon suitable pinions 21—21 meshing with a row of cooperating teeth 22 on each of the tubes 13. At one end of the said shaft 20, there is provided a worm gear 23 which meshes with a worm pinion 24 on a rotatable shaft 25 that is rotated by a hand wheel 26 which is connected to said shaft exteriorly of the respective housing 19.

At the top of each leg section 17, there is provided a suitable horizontal bearing portion 27 which includes a horizontal opening 28 in which there is rotatably mounted a respective end of a tubular supporting shaft 29 that has rigidly secured thereto horizontal bracket members 30—30 which are positioned adjacent to the sides of the said bearing portion; each of said brackets 30—30 having a pair of horizontal openings 31—31 therein adapted to receive the end of a locking bolt 32 that is slidable in a recess 33 in the respective portion 17 and is biased towards said openings by means of a spring 34; the said bolt having a stem portion 35 which projects exteriorly of the portion 17 and has a stud 36 in engagement with a cam surface 37 of a cam 38 that is rotatable in the opening 28 and rigidly secured to the end of an operating rod 39 which extends longitudinally through the tubular shaft 29 to the opposite bearing portion 27 of the other leg 9, at which location a similar cam member 38 and locking bolt 32 are provided.

The said operating rod 39 has connected to its opposite ends suitable handles 39-a by means of which it may be rotated from either end.

The frame 10 is swivelly mounted in a horizontal position upon the upper leg portions 17—17 by means of the shaft 29 and is preferably of a construction which includes a tube that is formed into portions providing a front longitudinal bar 40, end bars 41—41 and rear bars 42—42.

The said rear bars 42—42 extend through the brackets 30—30 and have their free ends secured to a pair of parallel spaced crossbars 43—43 which extend across said frame and support a pair of spaced parallel supporting bars 44—44 which extend longitudinally of the frame and have their opposite ends extending beyond the said bars 43—43. A pair of supporting plates 45—45 extend parallel to the said bars 43—43 and each has ears 47—47 by means of which it is swively connected to the extending end portions 46 of the bars 44—44 with swivel pins 48.

The said frame 10 is stiffened by a pair of downwardly bowed angled bars 49—49 which are connected to the brackets 30—30, at one end, and to the respective corner of the frame, as clearly shown in Fig 3 of the drawings.

Upon the top of said frame 10, there is provided a central table 50, which is preferably constructed of sheet metal and rigidly secured to the bars 44—44, and a pair of adjustable supporting plates 51—51 are secured to the plates 45—45 and extend therefrom and rest upon the end bars 41—41. The said plates 51—51 are also preferably of sheet metal and adjustable to be inclined in different positions relatively to the central table 50 and suitable means, which preferably include a separate adjusting mechanism for each of said plates 51—51, are provided for facilitating such adjustment. Each of said mechanisms may comprise a worm gear segment 52 which is rigidly secured to its respective plate 45 by means of an angle bracket 53 and extends downwardly into a housing 54 that depends from the supporting bar 29 and extends below the front end of the said plate 45. Within said housing, there is provided a worm pinion 55 on a shaft 56 which is rotatable in the housing. The said worm pinion meshes with the segment 52 and is rotated by means of a hand wheel 57 which rotates a shaft 58 and a bevel gear 59 thereon that meshes with a bevel gear 60 on the said shaft 56.

Each of the supporting plates 51—51 is notched at its opposite sides in order to provide open spaces 61—61 between the sides of said plates and the front bar 40 and rear bars 42—42 of the frame 10, and below each of said spaces there is provided an adjustable footrest which preferably comprises a bar 62 that is supported by its ends in a pair of opposed brackets 63—63 which depend from the said front and rear bars and have a series of notches 64 therein to retain the said bar 62 in different positions with relation to the central table 50 and parallel thereto.

Each of the feet 5—5 is rotatable in a horizontal plane relatively to its respective leg 9 and may be secured in adjusted position by means of a bolt 65 which is slidable in the base member 12 and biased into engagement with a series of openings 66 in the plate 11 so as to locate the said foot in a selected angular position relatively to the leg when it is desired to fold the feet for storage purposes; the said bolt 65 being operable by means of an operating lever 67 which is pivotally mounted at 68 upon the member 12, as clearly shown in Fig. 11.

The central table 50 has an opening 69 therein through which the patient may defecate and a receptacle, in the form of a bedpan 70, is removably mounted below said opening and slidably supported in spaced parallel track bars 71—71 which are secured to the undersides of the supporting bars 44—44.

My improved bedpan vehicle is normally in the condition shown in Figs. 1, 2 and 5 and, when in this condition, may be used in the following manner:

The vehicle is pushed into position alongside of the patient's bed with the feet 5—5 extending under the bed and the frame 10 located above it. The said frame is then lowered upon the bed, alongside of the patient, by rotating the wheel 26. This wheel will rotate the shaft 25 and, through the worm pinion 24, worm gear 23 and the shaft 20, will rotate the pinions 21—21 and thereby raise or lower the said frame upon the legs 9—9 by sliding the housings 17—17 vertically upon the tubes 13—13.

When the frame 10 has thus been lowered upon the bed alongside the patient, the patient is either slid or rolled onto the central section 50 and the upper portion of his body is placed upon either of the end plates 51—51, depending upon the direction in which the patient's body is disposed on the bed. The frame 10, with the patient thereon, is then raised sufficiently to clear the bed and the vehicle is pulled away from the bed to a convenient location.

If it is desired to raise the patient towards a sitting position, the respective end table 51 may be raised by rotating the respective hand wheel 57 which will, through the pinions 59 and 60, rotate the worm pinion 55 and swing the worm segment 52 so as to thereby also swing the respective plate 45 and raise the said plate to an angled position, indicated in dotted lines in Fig. 2, so as to support the patient in a comfortable sitting position.

While the patient is so supported, he may be made more comfortable by inserting his feet through the notches 61—61 of the opposite table section 51 and resting them upon the respective supporting bar 62 and said bar can be adjusted along the rack 63 for the maximum comfort of the patient.

After the patient has been properly placed upon the top as above described, the pan 70 is placed upon the tracks 71—71 and slid into position below the opening 69 for the use of the patient.

When the patient is to be returned to his bed, the pan 70 is first removed and the above described operation of the vehicle is performed in reverse order.

It will be noted that suitable brake means, indicated at 72, may be provided for the wheels of the vehicle so that they may be locked against rotation to prevent unintentional movement of the vehicle. When it is desired to fold the said vehicle for storage purposes, the shaft 39 may be rotated by either of the handles 39a to cause rotation of the cams 38—38. This will pull the bolts 32—32 out of engagement with their respective locking recesses 31—31 in the brackets 30—30 and permit rotation of said brackets, and the tubular bar 29 that is secured thereto, and thereby lowering the frame 10 to the position shown in Fig. 6.

The feet 5—5 may also be swung into folded position, as shown in said Fig. 6, by operating the lever 67 to withdraw the bolt 65 from the recess 66 and thereby permitting swivel movement of said feet relatively to the tubes 13 of the legs.

It will be understood from the above description that my improved bedpan may be used from either side of the bed and with the patient lying in either direction.

I claim:

1. A bedpan vehicle including a frame having thereon a central table section and end sections mounted upon and hingedly secured to the central section at opposite sides thereof and adapted to rest upon the said frame, each of said end sections having a portion of a lesser width than the width of said frame, and a supporting bar mounted crosswise on said frame below and spaced from the said lesser width portion of each end section for supporting the feet of a patient sitting on the central section.

2. A bedpan vehicle including a frame having thereon a central table section with an opening therein, a pair of end table sections hingedly mounted adjacent to said central section and disposed at opposite sides thereof, the said end sections having notches in opposite sides thereof forming openings between said frame and end sections, means for independently raising either of said end sections to angular positions relatively to the central section, a pair of oppositely disposed brackets depending from said frame adjacent to the notches of each end section, and supporting bars mounted on said brackets and adjustable thereon relatively to the central section and spaced from and disposed below the said notches in the end sections.

3. A bedpan vehicle including a frame having front and rear longitudinally disposed parallel bar portions, spaced crossbars extending crosswise to the said longitudinal bar portions and secured thereto, a pair of spaced parallel supporting bars extending perpendicularly to the said crossbars and mounted thereon, a central table section supported upon said supporting bars, the said supporting bars having end portions projecting beyond the crossbars, a pair of oppositely disposed end table sections hingedly mounted upon the projecting end portions of said supporting bars, means for raising and lowering the said end sections to different angular positions relatively to the said central section, and leg members for supporting said frame.

4. A bedpan vehicle including a pair of vertically disposed leg members, a supporting bar rotatably mounted in the upper portions of said leg members, a pair of brackets extending from said supporting bar and secured against rotation relatively thereto, a frame mounted on said brackets and secured against rotation relatively thereto, each of said brackets having holes therein disposed about the axis of the supporting bar, a locking bolt in said upper portions of the leg members adapted to selectively engage each of said holes for retaining the frame in different positions relatively to the leg members, a cam member located at each opposite end of the supporting bar and adapted to retract the respective locking bolt to disengage the bracket and permit rotation of the supporting bar, and means for simultaneously rotating said cam members from either end of the supporting bar including an operating bar co-axial with and extending through said supporting bar and connected to both of said cam members.

5. A bedpan vehicle including a pair of vertically disposed leg members, a horizontally disposed supporting bar rotatably mounted upon said leg members, a bracket extending laterally from the said bar adjacent each end thereof, a frame secured to said bracket, a crossbar extending from said bracket and secured to the oposite side of said frame to support the frame upon the bracket and prevent rotation of the frame relatively to the bracket, a locking bolt slidable in each leg member and engageable with an opening in the respective one of said brackets to retain the frame in horizontal position, cam members rotatable upon the axis of the supporting bar and having cam surfaces operatively connected to the locking bolts for retracting said bolts from their respective openings in the brackets, springs for urging the bolts into engagement with said openings, an operating bar co-axial with the supporting bar and extending lengthwise therethrough and connected to both of the said cam members for simultaneously rotating said cam members upon the operation of either one, and handle means connected to both ends of said shaft for rotating it from either end.

6. A bedpan vehicle including vertically extending legs, a frame mounted upon said legs and extending horizontally therefrom, spaced parallel bars extending crosswise of said frame at an intermediate portion thereof, a pair of spaced parallel supporting bars extending across said crosswise bars and having end portions projecting beyond said crosswise bars, a pair of plates hingedly mounted upon the projecting end portions of the said supporting bars, a central table section mounted upon said supporting bars and having an opening therein, end table sections secured to said plates and resting upon said frame, means for raising and lowering said end sections at different angles relatively to the central section, a pair of parallel spaced track bars mounted upon the bottoms of the supporting bars, and a receptacle slidably and detachably mounted upon said track bars and below the opening in the central section.

References Cited in the file of this patent

UNITED STATES PATENTS

| | | |
|---|---|---|
| 645,888 | Burns | Mar. 20, 1900 |
| 813,799 | Hunzinger | Feb. 27, 1906 |
| 1,094,117 | Butler | Apr. 21, 1914 |
| 1,347,549 | Mote | July 27, 1920 |
| 1,404,482 | Sawyer | Jan. 24, 1922 |
| 2,234,483 | Sutton | Mar. 11, 1941 |
| 2,261,980 | Drexler | Nov. 11, 1941 |
| 2,500,544 | Haskins | Mar. 14, 1950 |
| 2,595,651 | Feist | May 6, 1952 |
| 2,610,330 | Sutton | Sept. 16, 1952 |
| 2,620,021 | Molla | Dec. 2, 1952 |
| 2,663,030 | Dahlberg | Dec. 22, 1953 |
| 2,666,930 | Lenahan | Jan. 26, 1954 |

FOREIGN PATENTS

| | | |
|---|---|---|
| 4,312 | Sweden | July 8, 1893 |
| 11,484 | Great Britain | of 1895 |